United States Patent [19]

Edwards

[11] 4,163,355
[45] Aug. 7, 1979

[54] CROP HARVESTING APPARATUS

[75] Inventor: John W. Edwards, Wauchula, Fla.

[73] Assignee: Ginny Bee Harvester Corporation, Tampa, Fla.

[21] Appl. No.: 742,086

[22] Filed: Nov. 16, 1976

Related U.S. Application Data

[63] Continuation of Ser. No. 570,718, Apr. 23, 1975, abandoned, which is a continuation-in-part of Ser. No. 508,903, Sep. 24, 1974, abandoned, which is a continuation-in-part of Ser. No. 410,262, Oct. 26, 1973, Pat. No. 3,992,861, which is a continuation-in-part of Ser. No. 386,421, Aug. 7, 1973, abandoned, which is a continuation-in-part of Ser. No. 362,453, May 21, 1973, abandoned, which is a continuation-in-part of Ser. No. 350,168, Apr. 11, 1973, abandoned, which is a continuation-in-part of Ser. No. 339,914, Mar. 9, 1973, abandoned.

[51] Int. Cl.² ............................................. A01D 46/20
[52] U.S. Cl. .................................................. 56/328 R
[58] Field of Search ............................ 56/328 R, 330

[56] References Cited

U.S. PATENT DOCUMENTS

| | | |
|---|---|---|
| 3,222,855 | 12/1965 | Lasswell, Jr. .................. 56/328 R |
| 3,462,930 | 8/1969 | Clark ............................. 56/328 R |
| 3,483,687 | 12/1969 | Tanner, Jr. ..................... 56/328 R |

Primary Examiner—Jay N. Eskovitz
Attorney, Agent, or Firm—Bernard & Brown

[57] ABSTRACT

A crop harvesting apparatus for harvesting treeborne crops such as fruits and nuts. A plurality of crop-severing rods extend from a planar support member from which the rods are mounted for rotation. In preferred embodiments, each crop-severing rod includes a crop-contacting surface portion. The rotating rods are thrust lengthwise into a crop-bearing plant and rotated, causing the crop-contacting surface portions to rotate orbitally to contact the crops to sever them from the plant. In one embodiment the crop-severing rods are mounted for orbital rotation on the outer cylindrical surface of a rotating cylinder, and in another embodiment the crop-severing rods extend from an end surface of a rotating cylinder, with the crop-severing rod longitudinal axis offset from the rotating cylinder longitudinal axis. In a further embodiment, the crop-severing rods are of oval cross-section and each rotates about its longitudinal axis to orbitally rotate a crop-contacting surface portion. In another embodiment, rigid, flexible crop-severing rods flex while rotating to rotate orbitally about the longitudinal axis of their mounting members.

33 Claims, 23 Drawing Figures

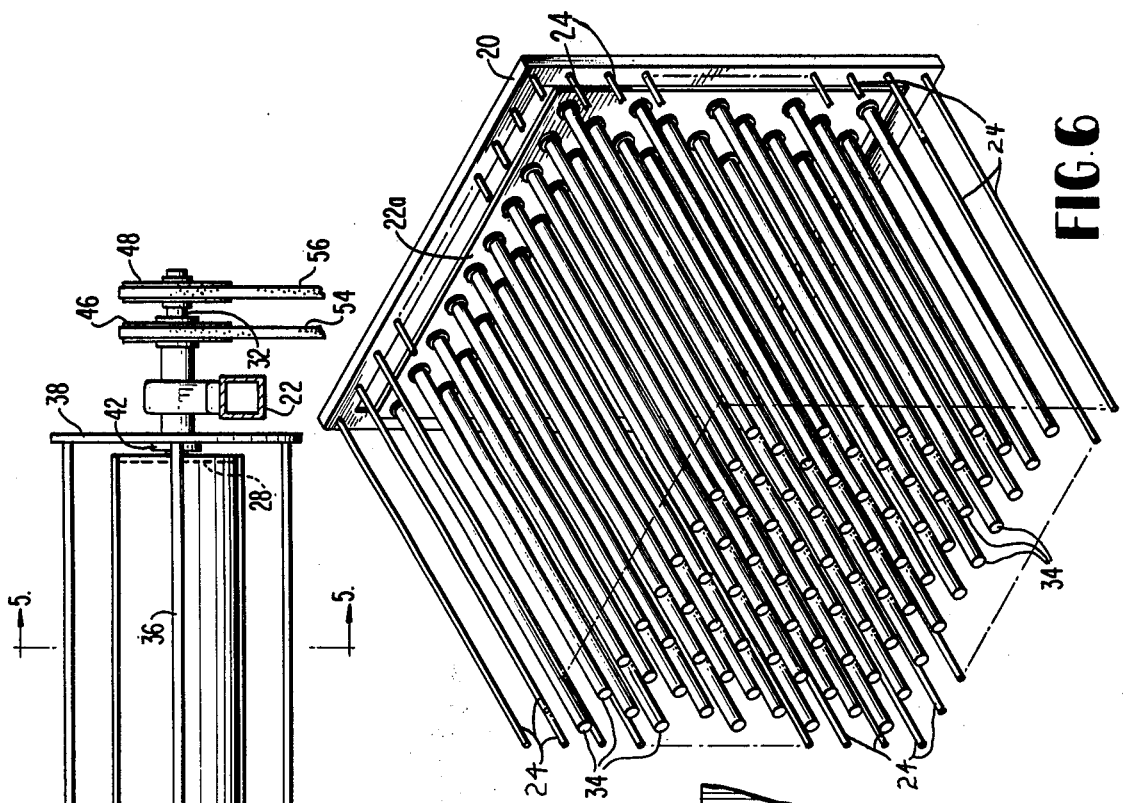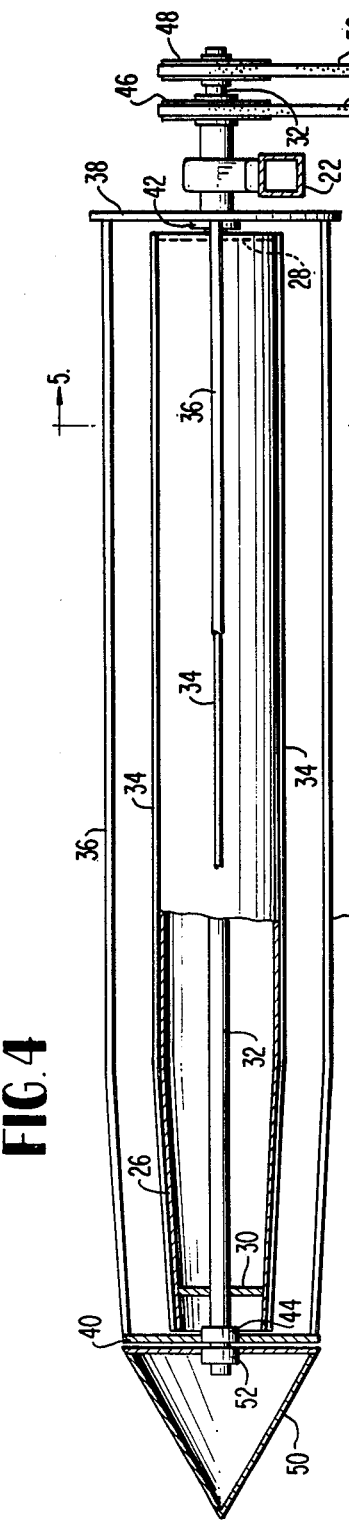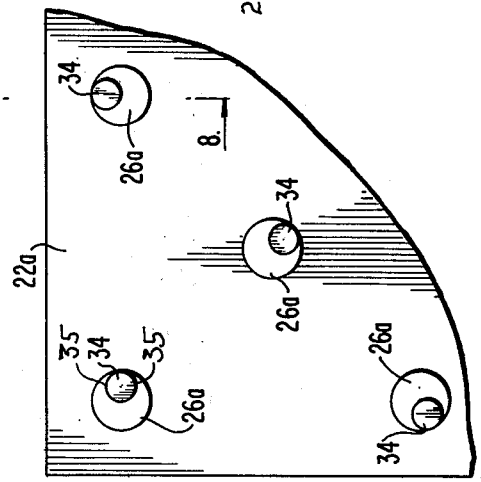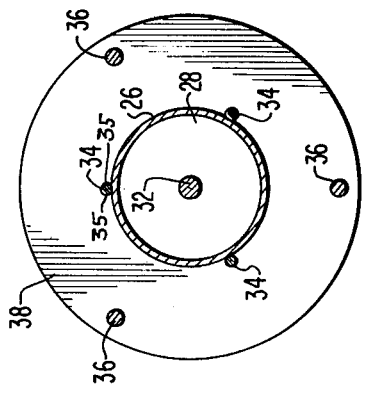

CROP HARVESTING APPARATUS

This application is a continuation of U.S. patent application Ser. No. 570,718, filed Apr. 23, 1975, now abandoned, which in turn is a continuation-in-part of U.S. patent application Ser. No. 508,903, filed Sept. 24, 1974, now abandoned. That application is a continuation-in-part of U.S. patent application Ser. No. 410,262, filed Oct. 26, 1973, now U.S. Pat. No. 3,992,861, which is a continuation-in-part of U.S. patent application Ser. No. 386,421, filed Aug. 7, 1973, and now abandoned. That application is a continuation-in-part of U.S. patent application Ser. No. 362,453, filed May 21, 1973, and now abandoned. This latter application in turn, is a continuation-in-part of U.S. patent application Ser. No. 350,168, filed Apr. 11, 1973, now abandoned, which is a continuation-in-part of U.S. patent application Ser. No. 339,914, filed Mar. 9, 1973, and now abandoned.

The present invention pertains to a crop harvesting apparatus. More particularly, the present invention pertains to an automated apparatus for the mechanized harvesting of crops and, in particular, tree-borne crops such as fruits, nuts and the like.

At the present time, many tree-borne crops such as fruit and nuts are harvested by hand. While attempts have been made to perfect mechanized crop harvesting apparatus, these have not been wholly successful heretofore. Many such apparatus either have caused damage to the crop-bearing plant or to the crop itself, or they have been unable to pick crops with great enough efficiency to be economically successful. Fruit trees must not be damaged to any extent during the harvesting of the fruit, or the tree will yield less fruit in subsequent crops. Thus, mechanized fruit harvesting apparatus must be capable of removing the fruit from the trees without removing an excessive quantity of leaves and branches. Removal of even a small quantity of leaves and branches is undesirable, even though that may not cause appreciable damage to the trees, since such leaves and branches must be removed from among the fruit before marketing. Likewise, the fruit inself must not be damaged to any great extent if it is to be marketable. While fruit which is intended for processing need not be in perfect condition, still, it cannot be damaged excessively or it will be unsuited even for processing. Accordingly, the fruit harvesting must be done without excessive damage to the crop.

U.S. Pat. No. 3,646,741, issued Mar. 7, 1972 to John W. Edwards, et al., discloses a crop harvesting apparatus overcoming many of the problems of prior crop harvesting devices. The apparatus disclosed in that patent includes an elongated hollow cylindrical shell with a plurality of crop-entry openings for the entry of the crop such as fruit and nuts, with each opening terminating in a crop-severing edge. The shell is thrust lengthwise among the crops and rotated, removing crops from the plants. Each crop-entry opening is provided with a closure or door to prevent mature, ripened fruit from leaving the shell via the crop-entry opening, while permitting immature, green fruit, leaves and branches to pass out the crop-entry opening without being severed from the plant. Although the apparatus disclosed in U.S Pat. No. 3,646,741 performs better than previously available mechanized crop harvesting devices, still shortcomings exist. The closures or doors on the crop-entry openings slow operation of the apparatus. While the apparatus does not remove so many leaves from the trees as to cause appreciable damage to the trees, still some leaves are removed and mixed with the harvested crops. This necessitates separating these leaves from the crops before marketing of the crops.

The several United States patent applications of which the present application is a continuation-in-part likewise show improved crop harvesting apparatus, generally including a rotatable drive shaft and crop-severing means mounted on the rotatable drive shaft for rotation therewith. These several forms of corp harvesting apparatus mount the rotatable drive shaft so that the apparatus is thrust into the crop-bearing plant with the rotatable drive shaft longitudinal axis transverse the direction of thrust. While these several forms of crop harvesting apparatus have provided improved performance, subsequent experimentation has resulted in still further improved forms of crop harvesting apparatus.

The present invention is an improved crop harvesting apparatus in which rotating crop-severing rods are thrust into crop-bearing plants with the crop-severing rod longitudinal axis directed into the plant and substantially perpendicular to the direction of thrust. In preferred embodiments, each crop-severing rod has a crop-contacting surface portion. The rotation of the crop-severing rods causes the crop-contacting surface portions to rotate orbitally to contact and remove the crops from the plants without removing an appreciable amount of leaves or branches. In one embodiment of the present invention, each crop-severing rod is mounted on the outer cylindrical surface of a cylinder which rotates about its longitudinal axis. In a second embodiment of the present invention, each crop-severing rod has a circular cross-section and is mounted to extend from an end surface of a cylinder with the rod longitudinal axis parallel to and offset from the cylinder longitudinal axis. Thus, in each of these embodiments, each crop-severing rod rotates orbitally about its mounting cylinder longitudinal axis.

In the further embodiment of the present invention, the crop-severing rods are of oval cross-section and each rotates about its longitudinal axis to rotate a crop-contacting surface portion orbitally about the rod longitudinal axis. In yet another embodiment of the present invention, the crop-severing rods are formed of a rigid yet flexible material so that as each crop-severing rod is rotated, it flexes to an orbital path about its axis of rotation.

If desired, foliage lifting rods can be provided to rotate around the rotating crop-severing rods to lift and shake foliage of the crop-bearing plant, assuring that all the crops are contacted by the crop-severing rods. Preferably, the crop-severing rods are mounted within crop catching rods which form a crop storage basket. Preferably, also, the crop harvesting apparatus is mounted on a self-propelled vehicle, for example at the end of a rotatable, pivoting, telescoping boom which permits insertion of the crop-severing rods among the foliage of a crop-bearing plant.

These and other aspects and advantages of the present invention are more apparent in the following detailed description and claims, particularly when considered in conjunction with the accompanying drawings in which like parts bear like reference numerals. In the drawings:

FIG. 4 is an enlarged, broken side elevational view depicting the mounting of the crop-severing rods of the crop harvesting apparatus of the embodiment depicted in FIG. 2, and is taken along line 4—4 of FIG. 2;

FIG. 5 is a sectional view taken along line 55 of FIG. 4;

FIG. 6 is an enlarged perspective view, partially broken, illustrating a second embodiment of crop harvesting apparatus in accordance with the present invention;

FIG. 7 is an enlarged, fragmentary, front elevational view of the crop harvesting apparatus of FIG. 6;

Figure 10:
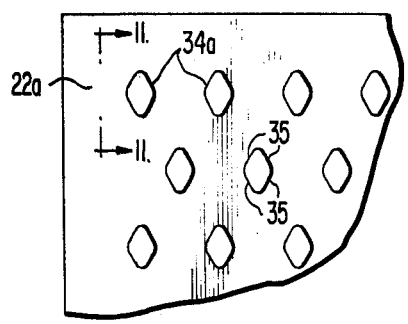
FIG. 10 is an enlarged fragmentary front elevational view of a further embodiment of crop harvesting apparatus in accordance with the present invention.
Figure 11A:
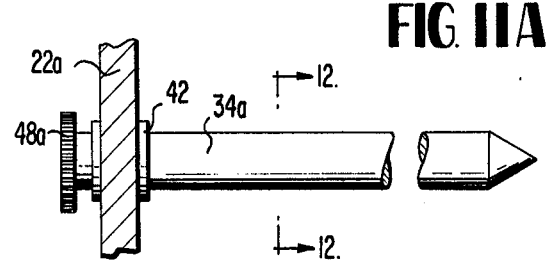
Figure 11B:
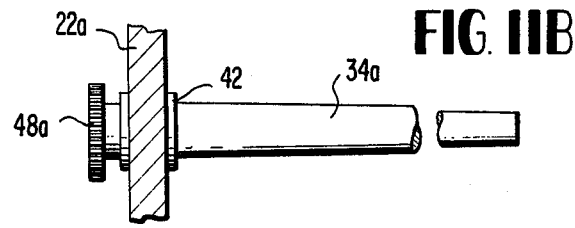
Figure 11C:
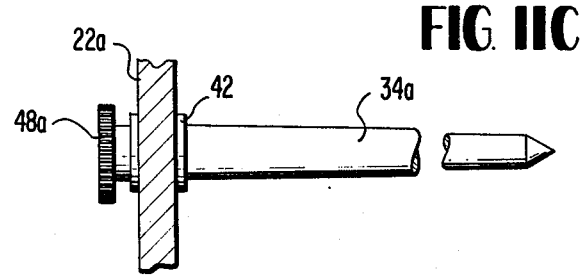
Figure 13:
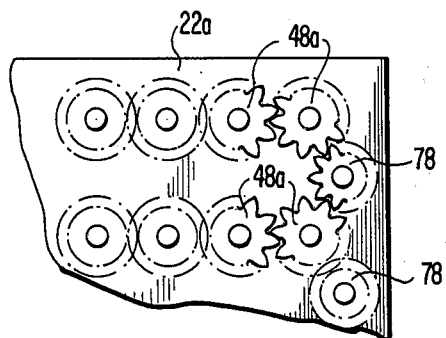
Figure 14:
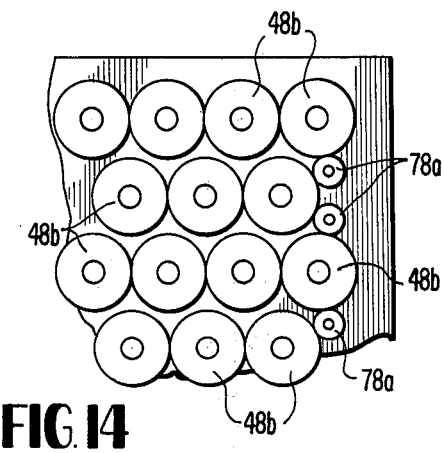
Figure 15:
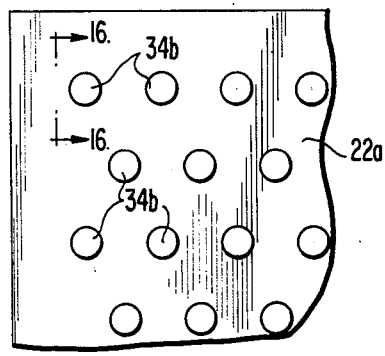
Figure 16:
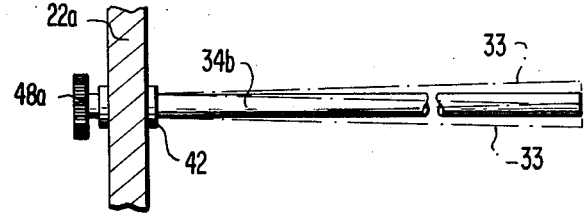
Figure 17:
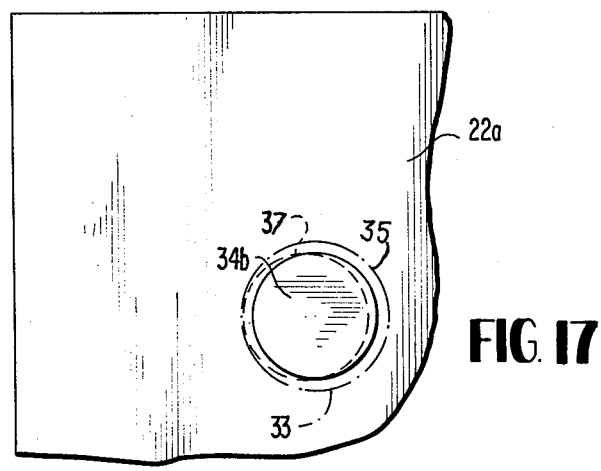

FIGS. 11A, 11B, and 11C are each broken sectional views illustrating alternative forms of crop-severing rods suitable for incorporation into the embodiment of crop harvesting apparatus of FIG. 10 and are generally taken along line 11—11 of FIG. 10;

FIGS. 12A, 12B, 12C, 12D, and 12E are each sectional views taken generally along line 12—12 of FIG. 11A and illustrate alternative forms of construction of crop-severing rods;

FIGS. 13 and 14 are fragmentary elevational views depicting alternative manners of powering of a crop harvesting apparatus in accordance with the present invention;

FIG. 15 is an enlarged fragmentary front elevational view of yet another embodiment of crop harvesting apparatus in accordance with the present invention;

FIG. 16 is a fragmentary sectional view taken generally along line 16—16 of FIG. 15; and FIG. 17 is an enlarged fragmentary front elevational view of a crop-severing rod from the embodiment of crop harvesting apparatus depicted in FIG. 15.

Figure 1:
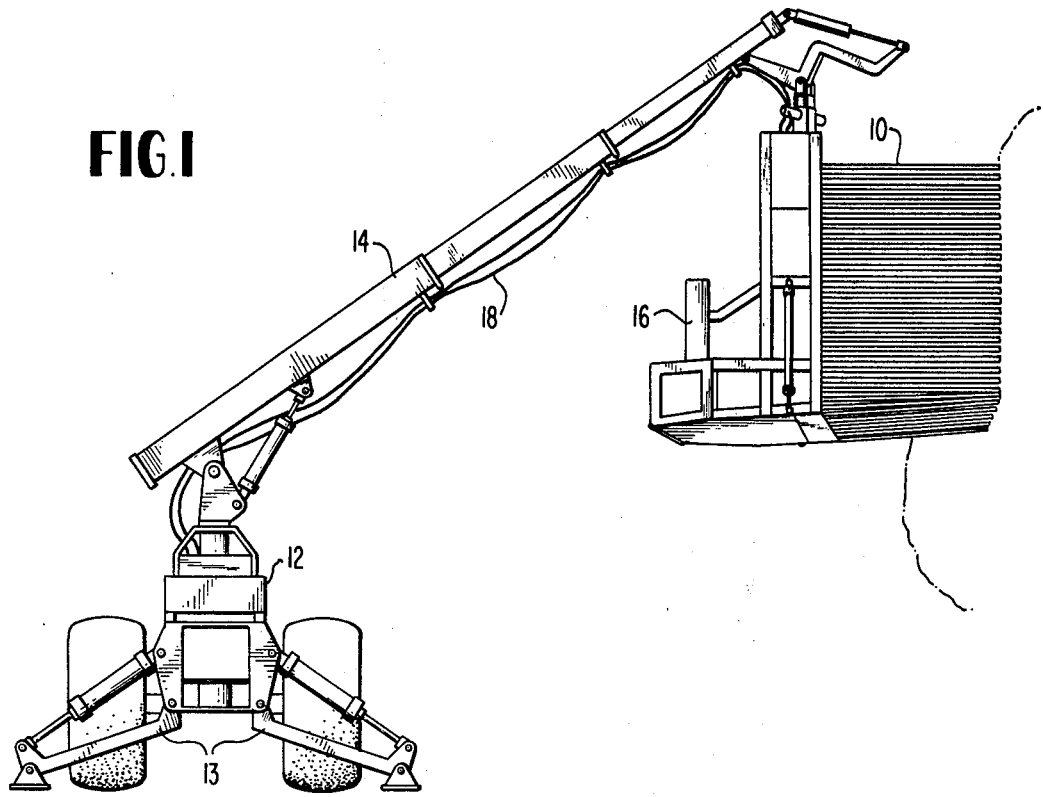
FIG. 1 is a perspective view of a crop harvesting apparatus in accordance with the present invention mounted on a suitable vehicle ready for the harvesting of three-borne crops.

FIG. 1 depicts a crop harvesting apparatus 10 in accordance with the present invention, mounted of a self-propelled vehicle 12 for the harvesting of crops. Vehicle 12 can be any suitable vehicle for propelling crop harvesting apparatus 10 through the crop-bearing plants, and the details of vehicle 12 are not critical to the present invention. For purposes of illustration, vehicle 12 is depicted as a tractor having a plurality of stabilizing legs 13. Crop harvesting apparatus 10 is suspended from one end of extendible boom 14 which is rotatably mounted on vehicle 12. Preferably, an operator's station 16 is provided adjacent crop harvesting apparatus 10, having controls not only for crop harvesting apparatus 10, but also for vehicle 12, to permit the operator to control the entire crop harvesting operation from a point adjacent the crop harvesting apparatus 10. The controls at operator's station 16 are coupled to tractor 12 by means of cables 18, which run along boom 14, so that the operator at station 16 can control the movement of tractor 12 from the operator's station 16 adjacent crop harvesting device 10.

Figure 2:
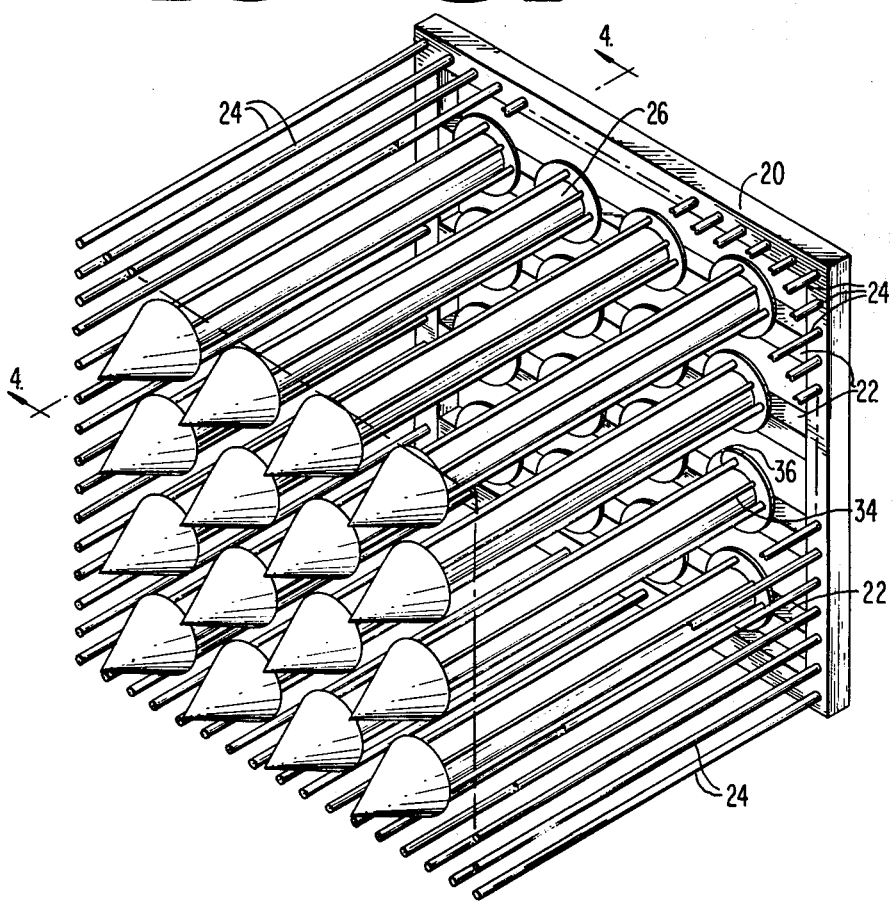
FIG. 2 is an enlarged perspective view illustrating a first embodiment of crop harvesting apparatus in accordance with the present invention.
Figure 3:
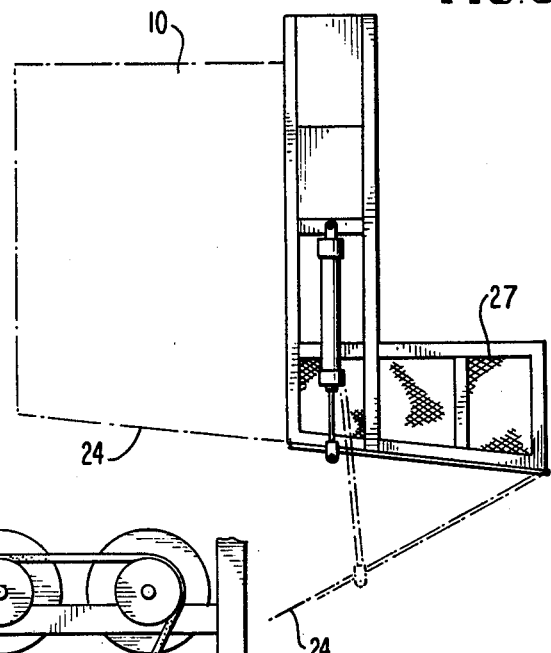
FIG. 3 is an enlarged perspective view, partially broken, of a crop harvesting apparatus in accordance with the present invention, including crop catching rods and a crop storage basket.

FIG. 2 illustrates a first embodiment of crop harvesting apparatus 10. Rectangular frame 20 is formed of, for example, metal I-beams. A plurality of support plates 22, such as I-beams, span the width of frame 20. Frame 20 and plates 22 thus make up a support member with a surface lying in a plane. Crop catching rods 24 extend from frame 20 to provide a crop catcher surrounding plates 22. For purposes of clarity in FIG. 2, a number of the crop catching rods are omitted or broken. Preferably, as depicted in FIG. 3, the crop catching rods 24, along the lower surface of crop harvesting apparatus 10, are sloped downwardly at the rear to cause the crops to roll toward the rear of crop harvesting device 10. Preferably, also, as depicted in FIG. 3, these sloped crop catching rods 24, at the bottom of crop harvesting apparatus 10, extend beneath operator station 16 to provide a crop storage area 27. In such case, the sloped crop catching rods 24 can be hinged to permit those rods 24 to swing downwardly to discharge the crops from crop storage area 27.

In the embodiment of crop harvesting apparatus 10 illustrated in FIG. 2, crop-severing rods 34 are mounted on the outer cylindrical surfaces of rotatable cylinders 26. Foliage lifting rods 36 are mounted to rotate in paths surrounding the paths of rotation of crop-severing rods 34. As seen in FIG. 4, cylinder 26 is supported on drive shaft 32 by end plate 28 and support member 30. A plurality of crop-severing rods 34 mounted on the outer cylindrical surface of cylinder 26 so that crop-severing rods 34 rotate orbitally about the axis of drive shaft 32. Preferably, as illustrated in FIG. 4, the forward end of cylinder 26 is slightly tapered. A plurality of foliage lifting rods 36 extend between rear plate 38 and forward plate 40. As depicted in FIG. 5, foliage lifting rods 36 overlay cylinder 26 and crop-severing rods 34 to rotate orbitally thereabout. Foliage lifting rods 36 are, likewise, preferably tapered at their forward end, as illustrated in FIG. 4. Drive shaft 32 passes through rear plate 38, being journalled therefrom by bearing assembly 42. Similarly, drive shaft 32 passes through forward plate 40 and is journalled therefrom by bearing assembly 44. Pulley 46 is mounted on bearing assembly 42 for rotation with respect to drive shaft 32. Pulley 48 is mounted on drive shaft 32. End cone 50 is mounted on the forward end of drive shaft 32, but is journalled therefrom by bearing assembly 52. Cylinder 26 and crop harvesting rods 34 are thus driven for rotation by pulley 46. End cone 50 is not driven by either pulley but, in practice, is likely to rotate somewhat due to slight frictional drive between drive shaft 32 and bearing assembly 52.

The several pulleys 46 and the several pulleys 48 of crop harvesting device 10 are coupled by belts 54 and 56 to two drive sources. A first drive source is coupled by belt 56 to each pulley 48 to rotate the crop-severing rods 34 at a first speed, for example a speed in the range of from about 300 to about 1000 revolutions per minute, preferably about 500 revolutions per minute. Crop-severing rods 34 rotate orbitally about drive shaft 32. A second drive source is connected by belt 54 to each pulley 46 to rotate the foliage lifting rods 36 at a lower speed, for example a speed in the range of from about 30 to about 100 revolutions per minute, preferably about 50 revolutions per minute. Foliage lifting rods 36 likewise rotate orbitally about drive shaft 32 in orbits surrounding the orbits of crop-severing rods 32.

To harvest tree borne crops, crop harvesting device 10 is thrust into a crop-bearing plant, with the longitudinal axis of the crop-severing rods 32 substantially perpendicular to the direction of thrust, and the drive sources are actuated. The rotation of foliage lifting rods 36 lifts the foliage of the crop-bearing plant. Some crops might be severed by foliage lifting rods 36. Primarily, however, the crops hang down within the arc described by the rotation of foliage lifting rods 36 and are contacted by crop-severing rods 34. The crops are generally contacted by crop-severing rods 34 at one of the crop-contacting portions 35, depicted in FIG. 5, depending upon the direction of rotation, while the remainder of the rod circumference does not contact crops. The crop-severing rods generally contact fruit near the stem and sever the fruit from its foliage with a twisting and pulling action. Since crop-severing rods 34 are rotating at a relatively high speed, they sever the crops. With each rotation of slower rotating foliage lifting rods 36, the foliage of the crop-bearing plant moves or shakes to insure that all crops hang down to contact and be severed by crop-severing rods 34.

Figure 8:
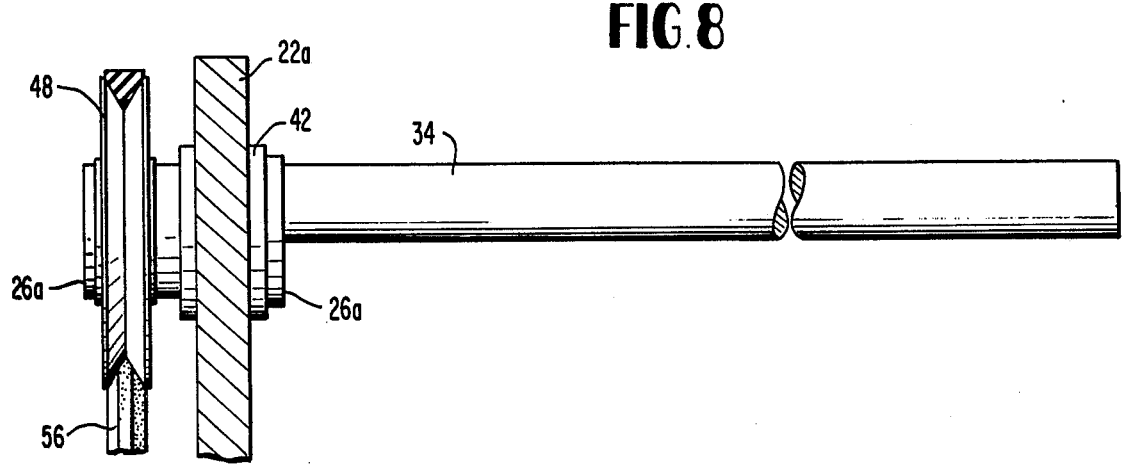
FIG. 8 is a fragmentary sectional view taken along line 8—8 of FIG. 7.

FIG. 6 depicts a second embodiment of crop harvesting apparatus 10. Again, crop catching rods 24 are supported by frame 20 to surround support plate 22a which is supported by frame 20. For purposes of clarity in FIG. 6 a number of the crop catching rods 24 are omitted or broken. A plurality of crop-severing rods 34 are mounted for rotation on plate 22a. FIGS. 7 and 8 depict the mounting of rods 34 on plate 22a. As seen in FIG. 7, each crop-severing rod 34 extends from an outer end surface of a mounting cylinder 26a with the longitudinal axis of the rod 34 parallel to and offset from the longitudinal axis of its mounting cylinder 26a. Mounting cylinder 26a is rotatably mounted on plate 22a by bearing assembly 42, as depicted in FIG. 8. On the side of plate 22a opposite crop-severing rod 34, a pulley 48 is mounted on cylinder 26a. As pulley 48 is driven by belt 56, mounting cylinder 26a rotates to cause crop-severing rod 34 to rotate orbitally about the longitudinal axis of mounting cylinder 26a.

As the crop harvesting apparatus of FIG. 6 is thrust into a crop-bearing plant, the several crop-severing rods 34 orbitally rotate to contact the crops. Again, the crops are generally contacted at the crop-contacting surface portion 35 on the outer half of the periphery of each rod 34, while the remainder of the rod surface does not contact crops. As the crops are severed from the plant, the crops fall to the lower crop-catching rods 24 and are retained in crop storage area 27. The crop-severing rods 34 of FIGS. 6, 7, and 8 might be rotated at a speed in the order of from about 1500 to about 3000 revolutions per minute, preferably about 2200, revolutions per minute. While crop-severing rods 34 of FIGS. 6, 7, and 8 might be formed of any suitable material, including metal, they preferably are formed of a glass fiber material, and, in such case, each rod 34 might have a weighted outer end.

Figure 9:
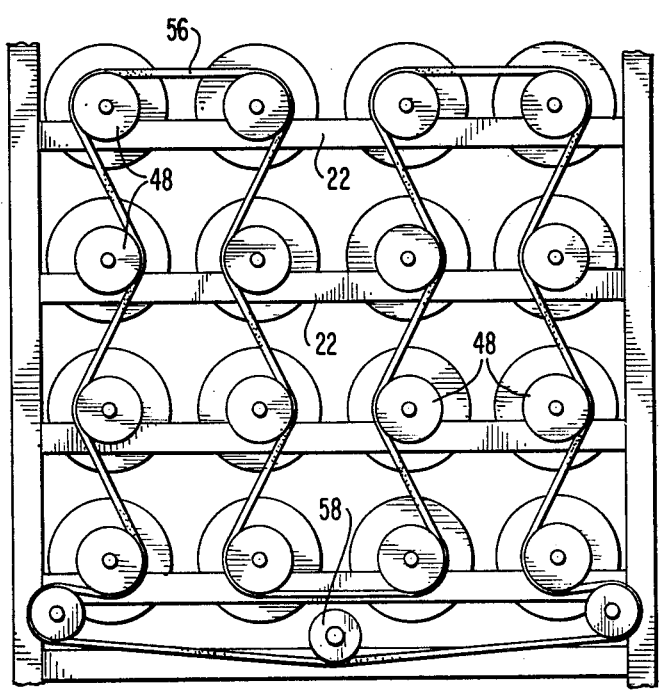
FIG. 9 is an elevational view depicting a first manner of powering of a crop harvesting apparatus in accordance with the present invention.

Preferably, each of the foliage lifting rod drive pulleys 46 is driven by one continuous belt 54 which is twined about every drive pulley 46. Likewise, each of the crop-severing rod drive pulleys 48 is preferably driven by a single continuous belt 56, as depicted by drive pulleys 48, powered pulley 58 and belt 56 in FIG. 9. As a result, some of the crop-severing rods 34 and some of the foliage lifting rods 36 are rotated clockwise, while others are rotated counter-clockwise.

Crop-severing rods 34 are of a size suitable for severing crops from crop bearing plants. By way of example, for the picking of oranges, crop-severing rods 34 might have a length in the order of about forty inches and a diameter in the order of about one-half inch. Each mounting cylinder 26 of FIGS. 4 and 5 might have a diameter of about six inches at its larger end, with this diameter extending about thirty inches, following which cylinder 26 might taper over an additional length of about ten inches to a diameter of about three inches at its smaller end. Mounting cylinders 26a of FIGS. 7 and 8 might have a diameter of about one inch and a length sufficient to fit through bearing assembly 42 and to support pulley 48. Preferably, the mounting cylinders 26a are mounted on support plate 22a in staggered rows, as depicted in FIG. 7.

FIGS. 10, 11, 12, and 13 illustrate further embodiments of crop harvesting apparatus in accordance with the present invention. As seen in FIG. 10, a plurality of crop-severing rods 34a extend from vertical support plate 22a in a manner similar to crop-severing rods 34 of FIGS. 6 and 7. Each crop-severing rod 34a has an oval cross-section with crop-contacting surface portions 35. Preferably the crop-severing rods 34a are mounted on support plate 22a in staggered rows, as depicted in FIG. 10. Each crop-severing rods 34a is rotatably mounted on plate 22 by means of a bearing assembly 42, as depicted in FIG. 11A. The crop-severing rods 34a are suitably adapted for rotation in bearing assembly 42. Thus, for example, each crop-severing rod 34a can have an oval cross-section over the major portion of its length but be tapered to a circular cross-section for passage through bearing assembly 42 to permit rotation of the crop-severing rod 34a within bearing assembly 42. Alternatively, each crop-severing rod 34a can extend from the outer end surface of a mounting cylinder, in a manner similar to the embodiment depicted in FIGS. 6 and 7.

On the opposite side of support plate 22a, each crop-severing rod 34a is driven by a gear 48a, as seen in FIG. 11A. The crop-severing rods 34a can be of uniform oval cross-section over the major portion of their length, as depicted in FIG. 11A, and the outer end of the crop-severing rods 34a can be tapered to a point or conical, as shown in FIG. 11A or can be blunt. Alternatively, the crop-severing rods 34a can be tapered over the major portion of their length from a larger diameter adjacent support plate 22a to a smaller diameter at the outer end, and such tapered rods can either terminate in a blunt outer end, as depicted in FIG. 11B, or in a pointed or conical outer end, as depicted in FIG. 11C.

Figure 12A:
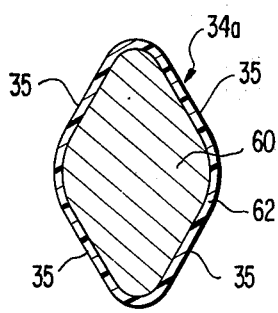
Figure 12B:
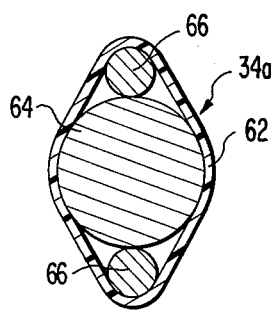
Figure 12C:
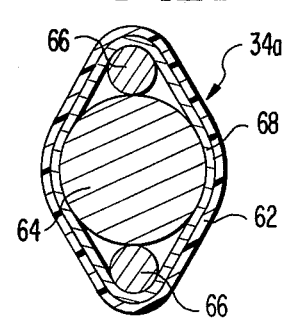

The crop-severing rods 34a can be of a solid construction, formed of a light, flexible material such as a glass fiber material, having a slightly weighted outer end if desired. FIGS. 12A, 12B, 12C, 12D, and 12E illustrate alternative forms of construction for crop-severing rods 34a. As seen in FIG. 12A each crop-severing rod 34 can have a solid inner core 60 formed of a material such as steel with a slightly resilient layer 62 of, for example, a glass fiber material. Oval core 60 can be cast in the desired oval cross-section or alternatively can originally be of a circular cross-section and can be machined to the desired oval cross-section. FIG. 12B illustrates an alternative form of construction in which the inner core is formed of a large circular central member 64 having smaller circular rods 66 fixed on two radially opposite surfaces thereof. Cores 64 and 66 are then surrounded by an oval jacket 62 to provide the desired oval outer surface. FIG. 12C shows a slightly modified form in which large core 64 and smaller cores 66 are enclosed by a sleeve 68, which might be formed of metal, with resilient jacket 62 on the outer surface of sleeve 68. Sleeve 68 and resilient jacket 62 provide added strength while retaining the desired resiliency on the crop-contacting surface portions.

Figure 12D:
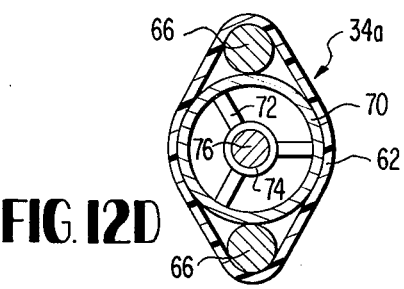
Figure 12E:
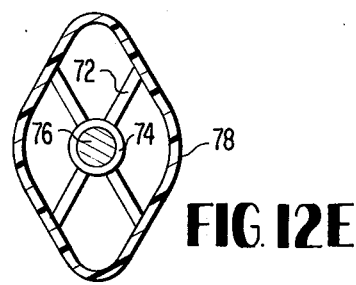

FIG. 12D shows a preferred form of construction for crop-severing rods 34a in which a cylindrical tube 70 is mounted by spider member 72 and journal member 74 on drive shaft 76. Smaller cores 68 are provided on two radially opposite surfaces of cylinder 70. Resilient layer 62 encloses cylinder 70 and cores 66 to provide the desired oval configuration. Drive shaft 76 is fixedly connected to drive gear 48a, while journal member 74 is frictionally driven by drive shaft 76. Thus when crops are being harvested, gear 48a drives shaft 76 at a high speed of rotation, and shaft 76 frictionally drives crop-severing rod 34a. Should a crop-severing rod 34a snag on foliage of the crop bearing plant, its rotation is stopped since the frictional drive permits drive shaft 76 to rotate without rotation of crop-severing rod 34a. FIG. 12E shows a slightly modified embodiment in which spider member 72 is directly attached to oval outer member 78. Again, spider member 72 is connected to journal member 74 which is frictionally driven by drive shaft 76.

Crop-severing rods 34a can be of any desired dimensions. By way of example each crop-severing rod 34a can have an oval cross-section with a major diameter in the order of one and one-half inches and a minor diameter in the order of one inch. The construction of FIG. 12B can then be provided utilizing a large core 64 with a diameter in the order of one inch and small cores 66 each having a diameter in the order of one-fourth inch. In the tapered construction of FIGs. 11B and 11C the crop-severing rods 34a can have at the larger end adjacent support plate 22a a major dimension in the order of one and one-half inches and a minor dimension in the order of one inch, while at the outer end the tapered crop-severing rod might have a major dimension in the order of one inch and a minor dimension in the order of one-half inch. Preferably the crop-severing rods are somewhat resilient to avoid damage to the crop-bearing foliage. The resilient jacket 62 is preferred for this purpose.

The crop-severing rods 34 can be driven at any desired speed dependent upon the crops being harvested, for example, for citrus fruit such as oranges a speed in the order of from about 1000 RPM to about 3000 RPM, preferably a speed in the order of about 2000 RPM. If desired, crop-severing rods 34 might be driven eccentrically to impart a slight vertical or horizontal reciprocating movement as the crop-severing rods rotate.

FIG. 13 illustrates a manner of driving the crop-severing rods 34 or 34a. The gears 48a in each horizontal row of crop-severing rods are intermeshed, and coupling gears 78 are provided between horizontal rows, thus a single drive source drives all of the crop-severing rods 34a, and adjacent crop-severing rods 34a are driven in opposite rotational directions.

FIG. 14 depicts an alternative manner of driving the crop-severing rods 34 or 34a. Drive wheels 48b are utilized in place of gears 48a. The drive wheels 48b in each row of drive wheels contact each other, and coupling wheels 78a interconnect the rows. Thus, a simple drive source frictionally drives all the drive wheels and so all the rods 34 and 34a.

FIGS. 15, 16, and 17 depict yet another embodiment of crop harvesting device in accordance with the present invention. As depicted in FIG. 15, a plurality of crop-severing rods 34b extend from vertical support plate 22a in a manner similar to crop-severing rods 34 of FIGS. 6 and 7. Each crop-severing rod 34b is of a circular cross-section with a diameter in the order of about one and one-half inches and a length in the order of about four feet. As many as one hundred fifty or more crop-severing rods 34b might be mounted on support plate 22a, spaced, for example, on four inch centers. As seen in FIG. 16, each crop-severing rod 34b is rotatably mounted on support plate 22a by means of a bearing assembly 42 and is driven by means such as gear 48a or such as drive wheel 48b or a pulley and drive belt. Each crop-severing rod 34b is driven to rotate about the longitudinal axis of its bearing assembly 42.

Each crop-severing rod 34b is formed of a rigid, flexible material. By "rigid, flexible material" is meant a material which has sufficient strength and rigidity to sever crops from crop-bearing foliage when actuated therein, yet which flexes slightly upon rotation at operating speeds, say speeds in the order of from about 1000 RPM to about 3000 RPM. Suitable materials include synthetic resinous compositions such as polyolefins, for example polypropylene and polyethylene, acrylate and methacrylate-containing polymers, and glass-fiber containing materials. A preferred material is a thermoplastic polycarbonate such as that available commercially from General Electric Company under the trademark LEXAN.

When rigid, flexible crop-severing rods 34b are rotated at operating speed, they flex slightly. As a consequence, rather than rotating about its own axis, each rigid, flexible crop-severing rod 34b rotates orbitally about the longitudinal axis of its bearing assembly 42a. In FIGS. 16 and 17, the rest position of crop-severing rod 34 is depicted in solid line, while the orbital path of rotation is depicted by long-dash outline 33. With a rigid, flexible crop-severing rod 34b having a diameter in the order of one and one-half inches, this flexing might offset the rod a distance in the order of one-fourth inch from its rest position. Short-dash outline 37 in FIG. 17 depicts an instantaneous position of rigid, flexible rod 34b as it flexes into orbital path 33. As rigid, flexible crop-severing rod 34b rotates orbitally, say, clockwise in FIG. 17, the leading end 35 thereof comprises a crop-contacting portion which contacts the crops on the crop-bearing foliage to remove such crops from crop-bearing plant.

A workable crop harvesting apparatus might be formed utilizing crop-severing rods such as rods 34b spaced closer together, for example at intervals in the order of one inch, and rotated more slowly, for example in the range of from about 300 to about 1000 revolutions per minute, so that the rods do not flex. Then a crop, for example an orange, will be contacted on each side of its stem by rods which are rotating in opposite directions, and the crop will be rotated and severed.

The several embodiments of crop harvesting apparatus in accordance with the present invention are thus seen each to have crop-severing rods with crop-contacting portions which, upon rotation of the crop-severing rods, rotate orbitally to contact and sever the crops. Although the present invention has been described with reference to preferred embodiments, numerous modifications and re-arrangements could be made, and still the result would be within the scope of the invention.

What is claimed is:

1. A crop harvesting apparatus comprising:
a support member defining a plane;
a plurality of crop-severing rods, each of said plurality having a longitudinal axis and a crop-contacting surface portion;
each of said plurality of crop-severing rods having mounting means having a longitudinal axis and rotatably mounting its crop-severing rod on said support member for rotation of its crop-severing rod about an axis parallel to the longitudinal axis of that crop-severing rod, with the longitudinal axis of said crop-severing rods being substantially perpendicular to the support member plane for insertion of the crop-severing rods among crop-bearing foliage for harvesting of crops therefrom;
drive means for rotating said mounting means to rotate said crop-severing rods for orbital rotation of said crop-contacting surface portions about their respective mounting means longitudinal axis;
a plurality of crop-catching rods around said crop-severing rods for catching crops that have been severed from crop-bearing foliage; and
means defining a crop-storage area for storing crops that have been severed from crop-bearing foliage and caught by said crop-catching rods, including hinge means permitting hinged movement of said defining means for emptying of the crop-storage area.

2. A crop harvesting apparatus as claimed in claim 1 further comprising a self-propelled vehicle; second mounting means mounting said support member on said self-propelled vehicle for insertion of said crop-severing rods among crop-bearing foliage of a crop-bearing plant for harvesting of crops therefrom, and control means for controlling movement of said self-propelled vehicle and said crop-severing rods.

3. A crop harvesting apparatus as claimed in claim 2 in which said second mounting means includes a rotatable, pivotable telescoping boom.

4. A crop harvesting apparatus as claimed in claim 1 in which said support member includes a rectangular frame and a support plate spanning said rectangular frame.

5. A crop harvesting apparatus as claimed in claim 4 in which said mounting means mount said crop-severing rods on said support plate, and in which said plurality of crop-catching rods extend outwardly from said rectangular frame.

6. A crop harvesting apparatus as claimed in claim 5 in which said defining means comprises at least some of said crop-catching rods.

7. A crop harvesting apparatus as claimed in claim 1 in which said mounting means comprises a plurality of cylinders, each of said plurality of cylinders having an end surface, and in which a crop-severing rod is mounted to extend from the end surface of one of said cylinders for rotation about the longitudinal axis of said one cylinder.

8. A crop harvesting apparatus as claimed in claim 1 in which said mounting means mounts its crop-severing rod for orbital rotation about an axis parallel to and displaced from the longitudinal axis of that crop-severing rod.

9. A crop harvesting apparatus as claimed in claim 8 in which said mounting means comprises a plurality of cylinders, each of said plurality of cylinders having a longitudinal axis and an end surface, and in which a crop-severing rod is mounted to extend from the end surface of one of said cylinders with the crop-severing rod longitudinal axis parallel to and offset from the longitudinal axis of the associated cylinder for orbital rotation of the crop-severing rod about the longitudinal axis of the associated cylinder.

10. A crop harvesting apparatus comprising:
a support member including a rectangular frame and a support plate spanning said rectangular frame to define a plane;
a plurality of crop-severing rods, each of said plurality having a longitudinal axis and a crop-contacting surface portion;
each of said plurality of crop-severing rods having mounting means having a longitudinal axis and rotatably mounting its crop-severing rod on said support plate for rotation of its crop-severing rod about an axis parallel to the longitudinal axis of that crop-severing rod, with the longitudinal axis of said crop-severing rods being substantially perpendicular to the support member plane for insertion of the crop-severing rods among crop-bearing foliage for harvesting of crops therefrom;
drive means for rotating said mounting means to rotate said crop-severing rods for orbital rotation of said crop-contacting surface portions about their respective mounting means longitudinal axis; and
a plurality of crop-catching rods extending outwardly from said rectangular frame and positioned around said crop-severing rods for catching crops that have been severed from a crop-bearing plant, at least some of said crop-catching rods defining a crop-storage area for storing of crops that have been severed from a crop-bearing plant and caught by said crop-catching rods, with at least some of said crop-catching rods being hingedly connected to said support member, permitting hinged movement of said hingedly connected ones of said crop-catching rods for emptying the crop storage area.

11. A crop harvesting apparatus as claimed in claim 10 in which said mounting means mounts said crop-severing rods for orbital rotation of each of said plurality of crop-severing rods about an axis parallel to and displaced from the longitudinal axis of that crop-severing rod.

12. A crop harvesting apparatus as claimed in claim 11 further comprising a resilient cover member wrapped about each of said plurality of crop-severing rods.

13. A crop harvesting apparatus as claimed in claim 12 in which said resilient cover member is a glass fiber member.

14. A crop harvesting apparatus comprising:
a support member defining a plane;
a plurality of crop-severing rods, each of said plurality having a longitudinal axis and a crop-contacting surface portion;
each of said plurality of crop-severing rods having first mounting means having a longitudinal axis and rotatably mounting its crop-severing rod on said support member for rotation of its crop-severing rod about an axis parallel to the longitudinal axis of that crop-severing rod, with the longitudinal axis of said crop-severing rod being substantially perpendicular to the support member plane for insertion of the crop-severing rods among crop-bearing foliage for harvesting of crops therefrom;

a plurality of foliage-lifting rods, each of said plurality having a longitudinal axis;

second mounting means rotatably mounting said foliage-lifting rods on said support member, with the longitudinal axis of each of said plurality of foliage-lifting rods being substantially perpendicular to the support member plane for orbital rotation in an orbit surrounding the rotation of an associated crop-severing rod to lift foliage of a crop-bearing plant while permitting crops on such plant to contact and be severed by the associated crop-severing rod;

first drive means for rotating said first mounting means to rotate each of said plurality of crop-severing rods for orbital rotation of its crop-contacting surface portion about its first mounting means longitudinal axis; and second drive means for rotating said second mounting means to orbitally rotate each of said plurality of foliage-lifting rods.

15. A crop harvesting apparatus as claimed in claim 14 in which said first mounting means mounts said crop-severing rods for orbital rotation of each of said plurality of crop-severing rods about an axis parallel to and displaced from the longitudinal axis of that crop-severing rod.

16. A crop harvesting apparatus comprising:
a support member defining a plane;
a plurality of elongated cylinders, each of said plurality having a longitudinal axis and being rotatably mounted on said support member with its longitudinal axis substantially perpendicular to said support member plane;
a plurality of elongated crop-severing rods, each of said plurality of rods having a longitudinal axis, each of said plurality of crop-severing rods being mounted on the outer cylindrical surface of one of said elongated cylinders with the longitudinal axis of each of said plurality of crop-severing rods being substantially parallel with the longitudinal axis of its elongated cylinder for orbital rotation of said crop-severing rod about the longitudinal axis of its elongated cylinder; and
drive means for rotating said elongated cylinders to orbitally rotate said crop-severing rods.

17. A crop harvesting apparatus as claimed in claim 16 further comprising a plurality of end cones, one end cone being journalled on each of said plurality of said elongated cylinders for rotation independent of the rotation of its elongated cylinder.

18. A crop harvesting apparatus comprising:
a support member defining a plane;
a plurality of crop-severing rods, each of said plurality having a longitudinal axis and an oval cross-section with a crop-contacting surface portion;
each of said plurality of crop-severing rods having mounting means having a longitudinal axis and rotatably mounting its crop-severing rod on said support member for rotation of its crop-severing rod about the longitudinal axis of that crop-severing rod, with the longitudinal axis of said crop-severing rods being substantially perpendicular to the support member plane for insertion of the crop-severing rods among crop-bearing foliage for harvesting of crops therefrom; and
drive means for rotating said mounting means to rotate said crop-severing rods for orbital rotation of said crop-contacting surface portions about their respective mounting means longitudinal axis.

19. A crop harvesting apparatus as claimed in claim 18 in which each of said plurality of crop-severing rods has a first end portion adjacent said support member and in which each of said plurality of crop-severing rods is tapered from a first cross-sectional area adjacent said first end portion to a smaller cross-sectional area adjacent the second end portion thereof.

20. A crop harvesting apparatus as claimed in claim 19 in which said plurality of crop-severing rods has a second end portion terminating in a conical portion.

21. A crop harvesting apparatus as claimed in claim 18 in which each of said plurality of crop-severing rods has a second end portion terminating in a conical portion.

22. A crop harvesting apparatus as claimed in claim 18 further comprising a plurality of resilient cover members, a said cover member being wrapped about each of said plurality of crop-severing rods.

23. A crop harvesting apparatus as claimed in claim 22 in which each of said plurality of resilient cover members is a glass fiber member.

24. A crop harvesting apparatus as claimed in claim 18 further comprising a self-propelled vehicle; second mounting means mounting said support member on said self-propelled vehicle for insertion of said crop-severing rods among crop-bearing foliage of a crop-bearing plant for harvesting of crops therefrom, and control means for controlling movement of said self-propelled vehicle and said crop-severing rods.

25. A crop harvesting apparatus as claimed in claim 18 further comprising a plurality of crop-catching rods around said crop-severing rods for catching crops that have been severed from a crop-bearing plant.

26. A crop harvesting apparatus as claimed in claim 25 further comprising means defining a crop storage area for storing crops that have been severed from a crop-bearing plant and caught by said crop-catching rods.

27. A crop harvesting apparatus comprising:
a support member defining a plane;
a plurality of crop-severing rods, each of said plurality having a longitudinal axis and an oval cross-section with a crop-contacting surface portion;
each of said plurality of crop-severing rods having mounting means having a longitudinal axis and rotatably mounting its crop-severing rod on said support member for rotation of its crop-severing rod about the longitudinal axis of that crop-severing rod, with the longitudinal axis of said crop-severing rod being substantially perpendicular to the support member plane for insertion of the crop-severing rods among crop-bearing foliage for harvesting of crops therefrom; and
drive means for rotating said mounting means to rotate said crop-severing rods for orbital rotation of said crop-contacting surface portions about their respective mounting means longitudinal axis;
each of said plurality of crop-severing rods comprising a first elongated member having a substantially circular cross-section, a second elongated member having a substantially circular cross-section less than the cross-section of said first elongated member and positioned against said first elongated member with the second elongated member longitudinal axis being substantially parallel with the first elongated member longitudinal axis, a third elongated member having a substantially circular cross-section substantially equal to the cross-section of said second elongated member and positioned against said first elongated member and radially opposite said second elongated member with the third elongated member longitudinal axis being substantially parallel with the first elongated member longitudinal axis, and a cover member wrapped about said first, second and third elongated members to form an exterior surface of oval cross-section.

28. A crop harvesting apparatus as claimed in claim 27 in which said first elongated member comprises a drive shaft extending along the longitudinal axis of said first elongated member and connected to said mounting means, a hollow pipe member encircling said drive shaft, and coupling means coupling said drive shaft with said hollow pipe member.

29. A crop harvesting apparatus as claimed in claim 28 in which said coupling means frictionally couples said drive shaft with said hollow pipe member to permit rotation therebetween.

30. A crop harvesting apparatus as claimed in claim 27 in which said cover member is a resilient member.

31. A crop harvesting apparatus as claimed in claim 30 in which said cover member is a glass fiber member.

32. A crop harvesting apparatus comprising:

a support member defining a plane;

a plurality of hollow crop-severing rods, each of said plurality having a longitudinal axis and an oval cross-section;

each of said plurality of crop-severing rods having mounting means having a longitudinal axis and rotatably mounting its crop-severing rod on said support member for rotation of its crop-severing rod about the longitudinal axis of that crop-severing rod, with the longitudinal axis of said crop-severing rod being substantially perpendicular to the support member plane for insertion of the crop-severing rods among crop-bearing foliage for harvesting of crops therefrom;

a plurality of drive shafts, each of said plurality of drive shafts extending along the longitudinal axis of one of said hollow rods and connected to said mounting means;

coupling means coupling each of said plurality of drive shafts with a said hollow rod; and drive means for rotating said mounting means to rotate each of said plurality of crop-severing rods about said mounting means longitudinal axis.

33. A crop harvesting apparatus as claimed in claim 32 in which said coupling means frictionally couples said drive shaft with said hollow rod to permit rotation therebetween.

* * * * *